United States Patent [19]

Sink

[11] 4,128,045
[45] Dec. 5, 1978

[54] SYSTEM FOR ROTATING A CONTROL SHAFT
[75] Inventor: William H. Sink, Auburn, Ind.
[73] Assignee: Dana Corporation, Toledo, Ohio
[21] Appl. No.: 815,810
[22] Filed: Jul. 15, 1977
[51] Int. Cl.² .................. F01B 15/02; F16D 25/08
[52] U.S. Cl. ............................ 91/217; 92/117 A; 192/91 R
[58] Field of Search ............ 91/217; 92/117 A, 118; 74/25, 89.2, 89.21; 192/91 R, 85 C

[56] References Cited
U.S. PATENT DOCUMENTS

| 383,614 | 5/1888 | Bowen | 91/217 X |
|---|---|---|---|
| 876,758 | 1/1908 | Wolf | 91/217 X |
| 3,210,065 | 10/1965 | Linder et al. | 91/217 |
| 3,877,348 | 4/1975 | Sandlin | 92/161 X |

Primary Examiner—Benjamin W. Wyche
Attorney, Agent, or Firm—Donald R. Fraser

[57] ABSTRACT

A system for rotating a control shaft which includes a lever arm attached to the control shaft and having arm members extending radially outwardly from the shaft. A motor having a piston and rod assembly reciprocatively mounted in an outer housing is resiliently mounted relative to the control shaft. The rod is universally coupled to one of the arm members, while the other of the arm members is coupled through strap means to the outer housing of the motor. When the motor is energized, the rod applies a pushing force to tend to rotate the control shaft and the housing applies a pulling force to aid in rotating the control shaft.

7 Claims, 2 Drawing Figures

SYSTEM FOR ROTATING A CONTROL SHAFT

BACKGROUND OF THE INVENTION

Typically, the clutch in an automobile or a light truck is controlled by a clutch pedal connected through a linkage to the clutch throwout bearing. However, when the clutch must transmit relatively high loads such as in heavy duty trucks and construction equipment, the force required to move the clutch pedal is sufficiently high to warrant power assist devices. In addition, for some applications it is desirable to eliminate the rigid linkages typically utilized between the clutch pedal in the vehicle cab and the clutch. For example, in the "cab over" truck the linkage must be flexible or detachable for servicing purposes. Therefore, a fluid actuated operating mechanism can be utilized to actuate the clutch with reduced pedal effort in response to control of the driver through the clutch pedal and allow the use of a flexible cable or the like between the cab and the clutch. The fluid utilized in such applications is preferably pressurized air and is so referred to hereinafter although it will be understood that any gas or liquid can also be used.

Normally, clutch operating mechanisms are connected to a pivoted link to transmit force to the clutch throwout bearing. Most clutches have a bearing load curve that increases from full engagement to full disengagement and are readily controlled. Some clutches, have a lower bearing load at full disengagement than at some point between full engagement and full disengagement. The prior art air actuated clutch operating mechanisms are not satisfactory in operating such clutches.

The prior art air actuated operating mechanisms can be of the type which are operated from a source of vacuum, such as the intake manifold of the vehicle engine, or of the type which are operated from a source of air under pressure where a relatively high force is required. The operating mechanism requires a valve for connecting to and disconnecting from the source hwen it is desired to actuate the clutch.

SUMMARY OF THE INVENTION

It is an object of the present invention to produce a control shaft actuating mechanism particularly adapted for the control of a clutch release shaft whereby there is provided a flexible control line from a clutch pedal or treadle to the clutch release shaft mechanism to accommodate tilting cabs, flexing frame rails, cab to frame relative motion, resilient engine mountings, or other circumstances which complicate the use of a mechanical linkage.

Another object of the invention is to produce a control shaft actuating mechanism which reduces the effort required in normal clutch operation and at the same time improve the engagement characteristics of the vehicle - clutch combination.

Still another object of the invention is to produce a control shaft actuating mechanism wherein air is employed as the power source since such source is already available on most large vehicles to provide braking, radiator shutter control, transmission shifting, power steering and other power assist mechanisms.

Another object of the invention is to produce a control shaft actuating mechanism which provides a "fail safe" feature permitting manual operation of an associated clutch and for starter relief in cold weather with or without air pressure in the associated vehicle.

A further object of this invention is to produce an actuating mechanism for the control of a clutch release shaft which may be readily accommodated on vehicles wherein the engines are supported in part by mounts integral with the associated clutch housings known in the trade as nodal mounts.

Yet another object of the invention is to produce a control shaft actuating mechanism which is adaptable to existing and currently available transmissions; the use of standard mounting bracketing; and the elimination of special linkages to accommodate differing engine lengths and/or mounting angles.

The above as well as other objects and advantages of the invention will be achieved by a system for rotating a control shaft which includes lever means secured to the control shaft having at least two generally oppositely extending arm members; a extensible motor having extensible members means interconnecting one of the extensible members of said motor to one of the arm members of said lever means; strap means interconnecting another of the extensible members of said motor to another of the arm members of said lever means; and means for resiliently mounting the motor relative to the control shaft whereby when the motor is energized to cause the extensible members to extend a forces are applied to the arm members of the lever means to effect rotation of the control shaft.

BRIEF DESCRIPTION OF THE DRAWINGS

A complete understanding of the invention will become readily apparent to one skilled in the art from reading the following detailed description of an embodiment of the invention when considered in the light of the accompanying drawings in which.

DESCRIPTION OF PREFERRED EMBODIMENT

Figure 1:
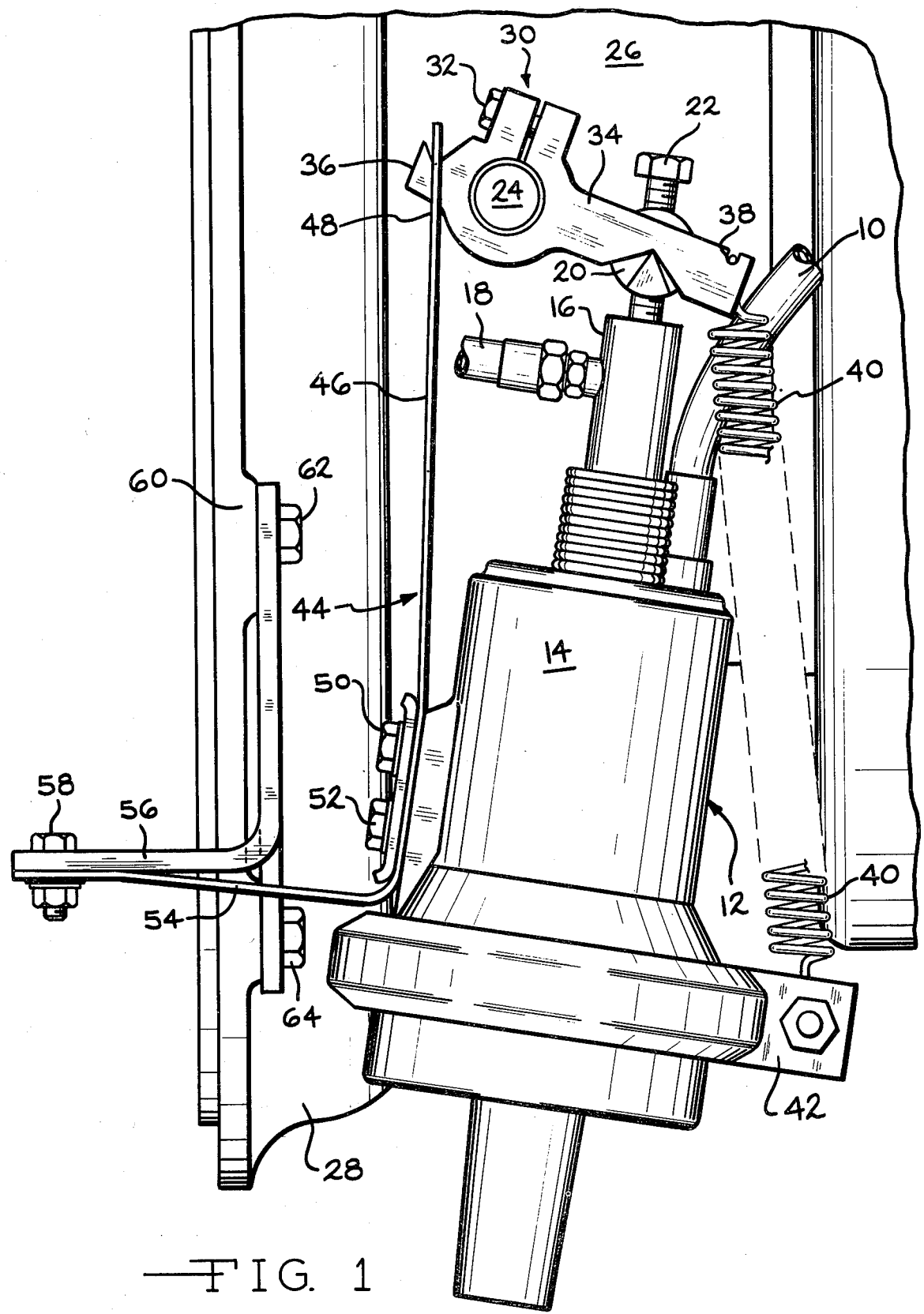
FIG. 1 is a front elevational view of an air operated clutch control system for a vehicle incorporating the principles of the invention.
Figure 2:
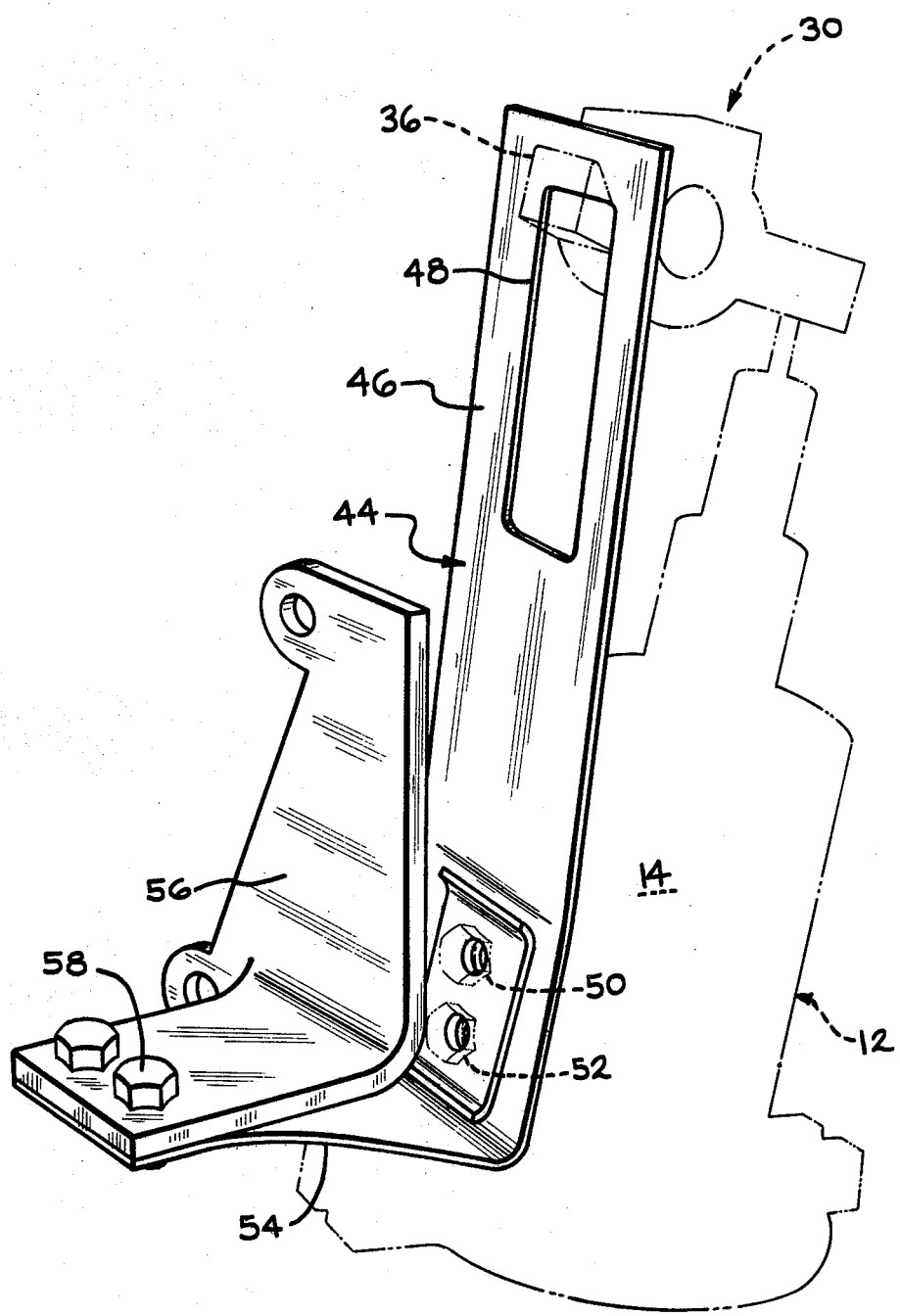
FIG. 2 is a prespective view of the resilient mounting and lever arm pulling strap illustrated in FIG. 1.

Referring to the drawings, there is illustrated in FIG. 1 a pneumatically operated clutch control system for vehicles incorporating the salient features of the present invention. Typically, a clutch pedal (not shown) is physically located in the cab portion of a vehicle and is pivotally mounted for movement between a free position and a depressed position. Preliminarily, a clutch pedal return spring is connected to the clutch pedal to constantly urge the pedal to a free position after it has been depressed and released. A flexible control cable 10 is connected between the clutch pedal and a pneumatically actuated motor 12. While a number of different types of motor arrangements could satisfactorily be employed in the system to be described, it has been found that laudatory results are achieved by utilizing the fluid motor system of the type described in a co-pending patent application entitled "A Fluid Actuated Operator And Clutch Linkage" William H. Sink and Russel L. Mitchener, filed May 3, 1976.

The motor 12 includes an outer housing 14 and piston rod 16 integral with an internally disposed reciprocating piston (not shown), a source of pressure fluid, such as air, for example, is coupled to the motor 12 through a flexible air line 18. A universal coupling 20 is threadably fastened to outermost end of the piston 16 by means of a threaded fastener 22.

A cross-shaft 24 is pivotally mounted in the side wall of a transmission housing 26. The cross-shaft 24 is typically internally connected to an actuator arm which is attached to the throwout bearing of a clutch mechanism housing within the clutch housing 28.

A lever 30 is mounted to the cross-shaft 24 and tightened thereon by a threaded fastener 32. The lever 30 has two generally opposed radially outwardly extending arm members 34 and 36. The outer end portion of the arm member 34 is pivotally connected to the piston rod 16 of the motor 12 by the coupling 20. The outermost end of the arm member 34 is provided with a groove 38 which is adapted to receive one end of a helical spring 40. The other end of the spring 40 is coupled to a bracket 42 which is connected to the housing 14 of the motor 12. The spring 40 tends to normally maintain the piston rod 16 in an unextended rest position with respect to the motor housing 14.

The motor housing 14 is mounted by means of a spring metal strap member 44 having a leg portion 46 provided with an opening 48 formed in the distal end thereof. The opposite end of the leg portion 46 is secured to the motor housing 14 by a pair of threaded fasteners 50 and 52, for example. The strap member 44, also, has another leg portion 54 arranged at a generally right angle to the leg portion 46, the end of which is connected to a mounting bracket 56 by means of a threaded fastener 58. The mounting bracket 56 is, in turn, mounted on a flange 60 of the clutch housing 28 by means of threaded fasteners 62 and 64.

Although specific mention has been made to forming the member 64 as a strap, it will be appreciated that the member 44 could be any suitable linkage arrangement. For example, the portions 46 and 54 of the member 44 could be in the form of pivoted linkages. Manifestly, the strap configuration illustrated in accompanying drawings is deemed to be an efficient, simple, and economical structure.

In operation, as the clutch pedal in the cab of an associated vehicle is depressed, the control cable 10 is simultaneously moved to effect an opening of a valve therein. The opening of the valve admits pressure fluid into the motor 12 through the line 18. The pressure fluid is operative to effect movement of the piston and a simultaneous outward extension of the piston rod 16. The extendable movement of the piston rod 16 applies a pushing force against the lever arm 34 of the lever 30 tending to rotate the cross-shaft 24 in a counterclockwise direction.

Concommittantly with the pushing force of the piston rod 16, there is an equal and opposite reactive force by the housing 14 of the motor 12 which is applied to by portion 46 of the strap 44. This pulling force is applied to the lever arm 36 of the lever 30 tending to rotate the cross-shaft 24 in a counterclockwise in addition to the pushing force applied through the piston rod 16 to the lever arm 34 of the lever 30. Any tendency of the motor housing 14 to cant during the operation can be accommodated by movement of the leg portion 54 of the strap member 44.

Accordingly, it will be appreciated that in the event that 900 inch pounds of torque were required, for example, to rotate the cross-shaft 24, the following perameters will achieve the desired result. The motor 12 is capable of delivering 300 pounds of force; the effective length of the lever arm 34 is 2 inches; and the effective length of the lever arm 36 is 1 inch. Therefore, we have the following torque applications applied to the shaft 24 all cooperating in a counterclockwise direction:

(1) 2 inches (lever arm 34) × 300 pounds (motor force) = 600 inch pounds
(2) 1 inch (lever arm 36) × 300 pound (reactive motor force) = 300 inch pounds (1) + (2) = 600 inch pounds + 300 inch pounds = 900 inch pounds.

With the above parameters, it will be seen that a total rotating force of 900 inch pounds of torque can be obtained from a fluid motor capable of delivering 300 pounds of force requiring only a 2 inch (34) and 1 inch (36) lever arm. Thus, where space requirements are an important consideration in the design of clutch actuating systems, for example, the present invention will be extremely useful. By utilizing the active and reactive forces of the extensible motor 12, the extension of the lever 30 away from the cross-shaft can be varied to allow the space available to accommodate the actuating mechanism.

From a practical manufacturing and operational standpoint, it has been found that with the utilization of the structural concepts of this invention, a considerably decreased loading is imposed on the supporting mounting bracket 56. Previous systems required a considerably larger and more imposing mounting assembly due to the high forces imposed thereon. In the instant improvement, the mounting bracket 56 must be designed to support the elements of the system and the rotational reactive forces which require a bracket of lesser dimensions thereby contributing to the overall acceptance of the present system.

While mention has been throughout the above description of the motor 12 being pressure fluid actuated, it will be understood that other types of extensible motors can be satisfactorily employed.

In accordance with the provisions of the patent statutes, the principle and mode of operation of the invention have been explained and illustrated in a preferred embodiment. However, it must be understood that within the spirit and scope of the appended claim, the invention may be practiced otherwise than as specifically illustrated and described.

What is claimed is:

1. A system for rotating a control shaft comprising:
support means including means for journalling the control shaft;
lever means secured to the control shaft having at least two radially extending arm members;
a motor having at least two extensible members;
means interconnecting one of the extensible members of said motor to one of the arms of said lever means;
means interconnecting the other of the extensible members of said motor to the other arm member of said lever means; and
leaf spring means connecting said motor to said support means whereby during operation said motor may cant relative to said support means.

2. The invention defined in claim 1 wherein said motor is a fluid motor.

3. The invention defined in claim 2 wherein said extensible members include an outer housing and an associated piston and rod reciprocatively mounted therein.

4. The invention defined in claim 3 including spring means for urging the piston and rod into the housing of said motor.

5. The invention defined in claim 4 wherein said spring means is a helical spring.

6. The invention defined in claim 2 wherein said fluid is air.

7. The invention defined in claim 1 wherein said means interconnecting the other of the extensible members of said motor is a strap means.

* * * * *